(12) United States Patent
Chlebowski et al.

(10) Patent No.: US 12,736,179 B2
(45) Date of Patent: Sep. 15, 2026

(54) LUBRICATED CABLE WITH REDUCED COEFFICIENT OF FRICTION

(71) Applicant: NEXANS, Courbevoie (FR)

(72) Inventors: Michael Chlebowski, Oakville (CA); Alain Blezy, New Hampton, NY (US); Hal Armstrong, Fergus (CA); Wissam Geahchan, Pickering (CA)

(73) Assignee: NEXANS, Courbevoie (FR)

( * ) Notice: Subject to any disclaimer, the term of this patent is extended or adjusted under 35 U.S.C. 154(b) by 31 days.

(21) Appl. No.: 18/380,855

(22) Filed: Oct. 17, 2023

(65) Prior Publication Data

US 2024/0167623 A1 May 23, 2024

(30) Foreign Application Priority Data

Nov. 18, 2022 (CA) ..................................... 3182380

(51) Int. Cl.

| | |
|---|---|
| ***H01B 3/00*** | (2006.01) |
| ***C08L 27/06*** | (2006.01) |
| ***F16N 1/00*** | (2006.01) |
| ***H01B 13/06*** | (2006.01) |
| ***H01B 13/22*** | (2006.01) |

(52) U.S. Cl.

CPC ................ *F16N 1/00* (2013.01); *C08L 27/06* (2013.01); *H01B 3/00* (2013.01); *H01B 13/06* (2013.01); *H01B 13/22* (2013.01); *C08L 2203/202* (2013.01); *C08L 2205/03* (2013.01); *F16N 2210/34* (2013.01)

(58) Field of Classification Search

CPC ....................................................... H01B 3/00

See application file for complete search history.

(56) References Cited

U.S. PATENT DOCUMENTS

| | | | |
|---|---|---|---|
| 3,565,213 | A | 2/1971 | Heller |
| 3,783,972 | A | 1/1974 | Molstad |
| 4,046,225 | A | 9/1977 | Shenk |
| 4,063,617 | A | 12/1977 | Shenk |
| 4,069,894 | A | 1/1978 | Black |
| 4,326,605 | A | 4/1982 | Conti |
| 4,422,529 | A | 12/1983 | Johansen |
| 4,749,059 | A | 6/1988 | Jonnes |
| 5,022,493 | A | 6/1991 | Buckelew |
| 5,632,356 | A | 5/1997 | Sells |
| 6,080,489 | A | 6/2000 | Mehta |
| 6,725,973 | B2 | 4/2004 | Coder |
| 7,411,129 | B2 | 8/2008 | Kummer |
| 7,557,301 | B2 | 7/2009 | Kummer |
| 7,749,024 | B2 | 7/2010 | Chambers |
| 8,986,586 | B2 | 3/2015 | Sasse |

(Continued)

*Primary Examiner* — Chau N Nguyen

(74) *Attorney, Agent, or Firm* — MUNCY, GEISSLER, OLDS & LOWE, P.C.

(57) ABSTRACT

The present arrangement provides for an electric cable having at least one insulated conductor and a jacket surrounding the at least one insulated conductor. The polymer composition of the jacket includes at least a base polymer, a first lubricant and a second lubricant. The first lubricant is paraffin oil lubricant included in the polymer composition of the jacket in the range of 0.8%-2% by weight and the second lubricant is a siloxane lubricant included in the polymer composition of the jacket in the range of 0.25%-1.0% by weight.

12 Claims, 4 Drawing Sheets

(56) References Cited

U.S. PATENT DOCUMENTS

| | | | | |
|---|---|---|---|---|
| 2006/0116486 | A1* | 6/2006 | Monma | C08L 59/00 525/398 |
| 2006/0254805 | A1* | 11/2006 | Scherer | H01B 11/203 174/129 R |
| 2017/0198130 | A1* | 7/2017 | Kim | C08K 5/10 |
| 2022/0041848 | A1* | 2/2022 | Liu | C08J 9/08 |

* cited by examiner

LUBRICATED CABLE WITH REDUCED COEFFICIENT OF FRICTION

RELATED APPLICATION

This application claims the benefit of priority from Canadian Patent Application No. 3182380, filed on Nov. 22, 2022, the entirety of which is incorporated by reference.

FIELD OF THE INVENTION

This application relates to an electric cable, and the outer jacket thereon. More particularly, the present application relates to an electric cable with a lubricated outer jacket.

BACKGROUND

In the cable industry prior to about the year 2000, it was a well-known practice to lubricate the outside of a cable prior to installation. For example, in order to make it easier to pull an insulated electrical cable through a conduit, it was an accepted practice to first lubricate the cable with a suitable lubricant, such as soap or other externally applied cable lubricants.

Instead of applying this external lubricant by hand, there have been many proposed devices to assist the installer to apply the lubricant. Representative examples of these devices are disclosed in U.S. Pat. No. 3,505,213 to Heller; U.S. Pat. No. 3,783,972 to Molstad, U.S. Pat. Nos. 4,046,225 and 4,063,617 to Shenk, U.S. Pat. No. 4,069,894 to Black, U.S. Pat. No. 4,326,605 to Conti, U.S. Pat. No. 4,422,529 to Johansen, U.S. Pat. No. 4,749,059 to Jonnes et al., U.S. Pat. No. 5,022,493 to Buckelew and U.S. Pat. No. 5,632,356 to Sells. See also U.S. Pat. No. 6,725,973 to Coder which is incorporated by reference.

In some instances, instead of adding an external lubricant to the outside of the cable, a lubricant can be incorporated into the polymer itself, used for the outer jacket. For example, this lubricant is of a type, and included in an amount, to permeate to the outer surface of the jacket of the cable to reduce the coefficient of friction and thus reduce the required pulling force needed to install the cable through various joists and conduits. The present Applicant has been using such a concept since the late 1970s for example by incorporating a paraffin oil into its PVC (PolyVinyl Chloride) jacketed cables, using for example Sunpar110 (a type of paraffin oil) in about 1-2% by weight of the jacket polymer composition. This works to reduce the surface coefficient of such cables making it easier to pull through joists during installation.

Additional prior art cable jacket lubrication is known starting around 1990s with Dow Chemicals' siloxane/silicone based Masterbatch additives. Masterbatch products make it possible to obtain a relatively uniform dispersion of one component, such as a lubricant, into a larger batch of polymer by mixing it into the screw section of an extruder while polymer pellets are fed in through the hopper thereof. Typically, Masterbatch pellets may include 25%-50%, of a selected lubricant such as siloxane with the remaining portion being a carrier polymer that is matched to or compatible with the target polymer into which the Masterbatch is to be blended. One example of such an additive is Dupont™ Masterbatch MB 50-320 which is an ultra-high molecular weight siloxane polymer, dispersed in Ethyl Vinyl Acetate polymer (i.e. the "carrier") which is compatible with PVC polymers. In one example, a polymer blend could include for example 5% MB 50-320 (50% siloxane) and 95% virgin PVC (no additives), resulting in a final PVC product that is approximately 2.5% by weight siloxane (5%×50%=2.5%). Similar siloxane Masterbatch products exist having siloxane lubricants with Nylon or PE/XLPE carriers for use in Nylon or PE/XLPE polymers respectively.

These Masterbatch products were produced, at least in part, for the purposes of providing polymers like Nylon, PE, and/or PVC with improved surface lubrication for use in the cable industry. See for example, U.S. Pat. No. 6,080,489 to Mehta, incorporated by reference herein. See Also Masterbatch sheets submitted with an associated Information Disclosure Statement.

Thereafter many companies began using siloxane Masterbatch products to produce various lubricated PVC, Nylon, and/or XLPE jacketed cables.

In addition to the masterbatch type lubricants, other lubricant additives such as the fatty acid amide Erucamide were used to provide self-lubricated jacketed electric wires. See for example U.S. Pat. Nos. 7,411,129, 7,557,301, 7,749,024, and 8,986,586.

Although all of these prior art products are able to reduce the pulling force required to pull a cable through various objects such as holes in joists, conduits, drywall studs, etc . . . relative to a non-lubricated cable, the present Applicant has identified a problem with such prior art arrangements.

Both paraffin oil, in the case of PVC, as well as silicone in Nylon, PVC, and/or XLPE, have certain limits on use. For example, with silicone, various concentrations of silicone in the final product ranging from approximately 1%-15% have been suggested for lubricated cable jackets. However, as more silicone is added the present Applicant has discovered certain drawbacks. For example, the addition of siloxane beyond 1% as an active component of the polymer composition can cause extrusion processing problems causing an excessive amount of wasted product/wire. Additionally, it has been uncovered that increasing the additional lubricant levels of siloxane/silicone not only adds significant costs but also reaches a point where the incremental pulling force reduction benefits are small relative to the added additional lubricant.

Regarding paraffin oil, addition beyond 2%, such as to PVC, results in processing instability in compounding the PVC jacket as well as poor final PVC qualities.

OBJECTS AND SUMMARY

The present arrangement overcomes the drawbacks associated with the prior art by providing an electric cable with a lubricated outer jacket that has improved reduced coefficient of friction, and lower required pulling forces at a lower cost, and without the processing errors associated with excess amounts of lubricant.

To this end, the present arrangement provides for an electric cable with an outer jacket having a polymer that includes a combination of paraffin oil lubricant, combined with a silicone/siloxane lubricant (e.g. acrylate functionalized polyethylene dimethyl siloxane, a silicone precursor). These lubricant amounts are selected to be in low enough concentrations to prevent unwanted processing and extrusion errors, and also to prevent unwanted qualities in the final product. Simultaneously, the blended paraffin oil and silicone/siloxane lubricants are sufficient, working together, to produce the synergistic effect of a reduced coefficient of friction that is both better than the individual lubricants alone at the same total concentration, as well as being reduced relative to prior art arrangements that use even higher concentrations of either lubricant alone. This provides a cost effective lubricated outer jacket that has a lower coefficient of friction that prior art lubricated cables and that is both less expensive and exhibits less wasted product from extrusion errors or poor product quality.

To this end the present arrangement provides for an electric cable having at least one insulated conductor and a jacket surrounding the at least one insulated conductor. The polymer composition of the jacket includes at least a base polymer, a first lubricant and a second lubricant. The first lubricant is paraffin oil lubricant included in the polymer composition of the jacket in the range of 0.8%-2% by weight and the second lubricant is a siloxane lubricant included in the polymer composition of the jacket in the range of 0.25%-1.0% by weight.

BRIEF DESCRIPTION OF THE DRAWINGS

The present invention can be best understood through the following description and accompanying drawing, wherein.

DETAILED DESCRIPTION

Figure 1:
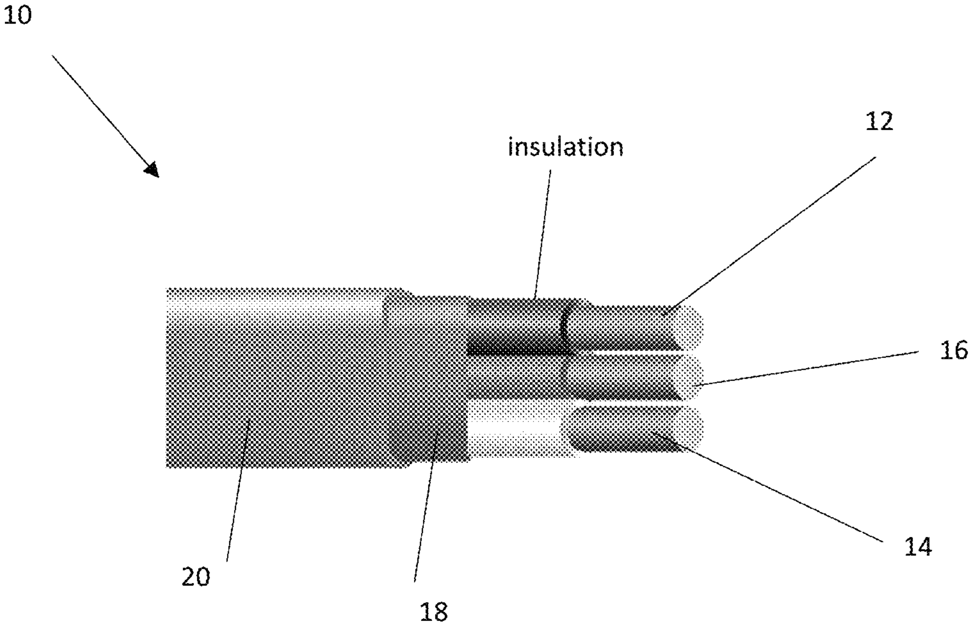
FIG. 1 illustrates an exemplary electric cable with a lubricated outer jacket, in accordance with one embodiment.

FIG. 1 illustrates a typically electrical cable that is subject to having a lubricated outer jacket according to one embodiment of the present invention. In this context, FIG. 1 shows an NMD90/NM-B type cable 10 typical for use in residential electric wiring. NMD90 is a Canadian designation referring to Non-Metallic Dry, rated to operate up to 90° C. Cable 10 may also be constructed as an NM-B (Non-Metallic, "B" referring to 90° C. rated operating temperature) which is roughly corresponding designation in the U.S. referring to a similar type electric cable. It is noted that the salient features of the present invention are not limited to any particular cable construction, and such lubricated jacket designs may be equally applicable to other cable constructions/variations. The cable 10 shown in FIG. 1 is for exemplary purposes only.

In FIG. 1, exemplary cable 10 includes a live conductor 12 and a neutral conductor item 14, both insulated with Nylon™ (Nylon is used as an exemplary thermoplastic polyamide) or possibly PVC (Poly Vinyl Chloride) or XLPE (Cross-Linked PolyEthylene) in other constructions. A bare central ground wire 16 is typically provided in the center position. In some arrangements, such as NM-B, conductors 12 and 14 and ground wire 16 may be held together with a dielectric paper binder layer 18. However, binder 18 is optional and may not be present, for example in NMD90 construction. In any case, an outer jacket 20 for example of PVC (poly-vinyl chloride), is applied as an extruded outer layer. As noted above, it is to be understood that this is just one exemplary material used for outer jacket 20 for the purposes of illustrating the salient features of this invention. The lubricated jacket features described in more detail below can be applied to other outer jackets of other cable constructions with different polymer compositions. For example, FIG. 1 illustrates cable 10 as a flat cable design, but the lubricated jacket features are also appliable to round cable 10 constructions.

Turning to the polymer formulation of our jacket 20, as noted above, the primary component is PVC having an exemplary composition as follows (exemplary composition breakdown given in % by weight not PHR (Parts per hundred resin)):

| | |
|---|---|
| PVC base | 37%-47% by weight |
| Phthalate Plasticizer | 20%-30% by weight |
| Paraffin oil (lubricant 1) | 0.8-2.0% by weight |
| Calcium Carbonate | 22%-32% by weight |
| Stabilizer | 0.7%-2.2% by weight |
| Antimony Trioxide | 0.1%-1.0% by weight |
| Siloxane (lubricant 2) | 0.25%-1% by weight |
| Lubricant 2 carrier (EVA) | 0.75%-3% by weight |

The PVC component is the base virgin polymer component for jacket 20. The phthalate plasticizer is typically used in the polymer blend for example to increase the polymer's flexibility, elongation or ease of processing (workability). Calcium carbonate is a typical additive for improving the finish and impact strength of the material. The stabilizers are used for example to add heat stability and processability during extrusion. Antimony trioxide may be added for example as a flame-retardant boosting additive. Such formulation components for the PVC jacket 20 are considered exemplary, are shown to give context for the lubricant components.

In this composition, the lubricating effects are provided by the combination of paraffin oil (lubricant 1) at 0.8%-2%, and in at least one arrangement at 1.7% by weight and siloxane component at 0.25%-1% and in at least one arrangement at 0.5% by weight. The siloxane component may, in some arrangements, be based on the use of a siloxane containing MasterBatch such as MB25-020 which is 25% siloxane by weight combined with a carrier of Ethylene Vinyl Acetate EVA at 75% by weight. For example, in the composition above, the 0.5% siloxane lubricant is incorporated into the PVC composition by the addition of 2% by weight of MB25-020, meaning that enough masterbatch MB25-020 such that the final amount of siloxane in the jacket is approximately 0.5%. To increase or decrease the amount of siloxane from 0.25%-1% in the PVC composition, 1%-4% of MB25-020 may be used, with corresponding offsets in percentages of the virgin PVC. As explained above, MB25-020 is only one possible manner of incorporating siloxane into the PVC formulation, other Masterbatch additives or possibly other forms of siloxane additives may be used as well.

Figure 2:
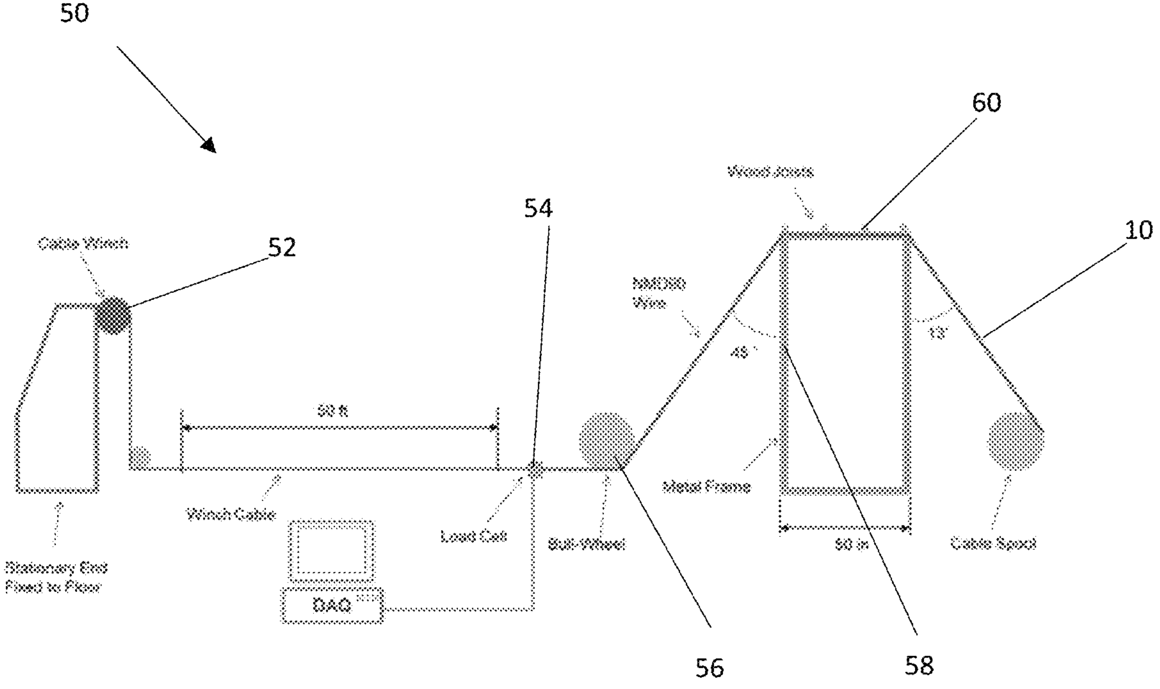
FIG. 2 illustrates an exemplary test rig used for testing the required pulling force of the cable of FIG. 1, in accordance with one embodiment.

Turning to measuring the reduced pulling force for cable 10 as result of the inclusion of siloxane and paraffin oil into the composition for jacket 20, an exemplary test rig 50 is prepared as shown in FIG. 2, having a cable winch 52, a load cell 54, a bull wheel 56, and a metal frame 58 with wood joists 60 across the top. Test rig 50 is initially based on a test rig defined in UL 719 which is an Underwriters Laboratory specification for testing for damage to cable jackets during common installation conditions. The present test rig 50 is modified to be used to test required installation pulling force. UL 719 is incorporated by reference.

Regarding the set-up of test rig 50, standard 75 m spools of cable 10 are used. The spools of each cable tested, including cable 10, are loaded onto a frame and positioned behind fixture frame 58 supporting four (4) wooden joists 60. Joists 60 may be constructed as standard 2×4 framing lumber with a series of six (6) ⅝" (inch) holes angularly bored (as defined in UL 719) through the broad face of the board with no attempt to smooth or round the edges of the holes after drilling. Bull-wheel 56 is positioned in front of frame 58 to align the exiting cable, such as wire 10 with pulling winch 52. The wires being tested are connected to a winch cable using a coupling fixture which contains load cell 54. Winch 52 is positioned to allow for at least 50 ft of cable, such as cable 10 or other prior art cables, to be pulled through joists 60. Spools of cable, joist frame 58, and bull-wheel 56 are ideally positioned to obtain the deflection angles specified in UL 719. The pulling tension, as measured by load cell 54, may be monitored continuously for example using a digital data logging system. An exemplary data logging rate may be one log event every one (1) second during the test. The ambient air temperature is ideally normal air temperatures such as 21° C. and 23° C. throughout all tests.

One exemplary manner of implementing test rig 50 is to run a minimum of five (5) pulls of each cable 10 (or prior art cable). For example, one at a time, cable 10 can be manually fed off its spool and through the holes in wooden joists 60. Cable 10 may then be fed under bull-wheel 56 and connected to a coupler at load cell 54. Load cell 54 is zeroed, and a winch cable is attached to another coupler on the other side of load cell 54. Winch 52 is then operated continuously until a minimum of 50 ft of cable had been pulled through joists 60. Cable 10 sample can be visually inspected for any signs of damage, including cracks or tears to jacket 20. Each hole may be used for one (1) pull to ensure that the smoothing of the hole or any lubricants from jacket 20 do not affect subsequent pull tests. In one exemplary embodiment, tests are carried out for at least 25-30 seconds with the test results being measured in pounds (.lbs) at load cell 54.

Figure 3:
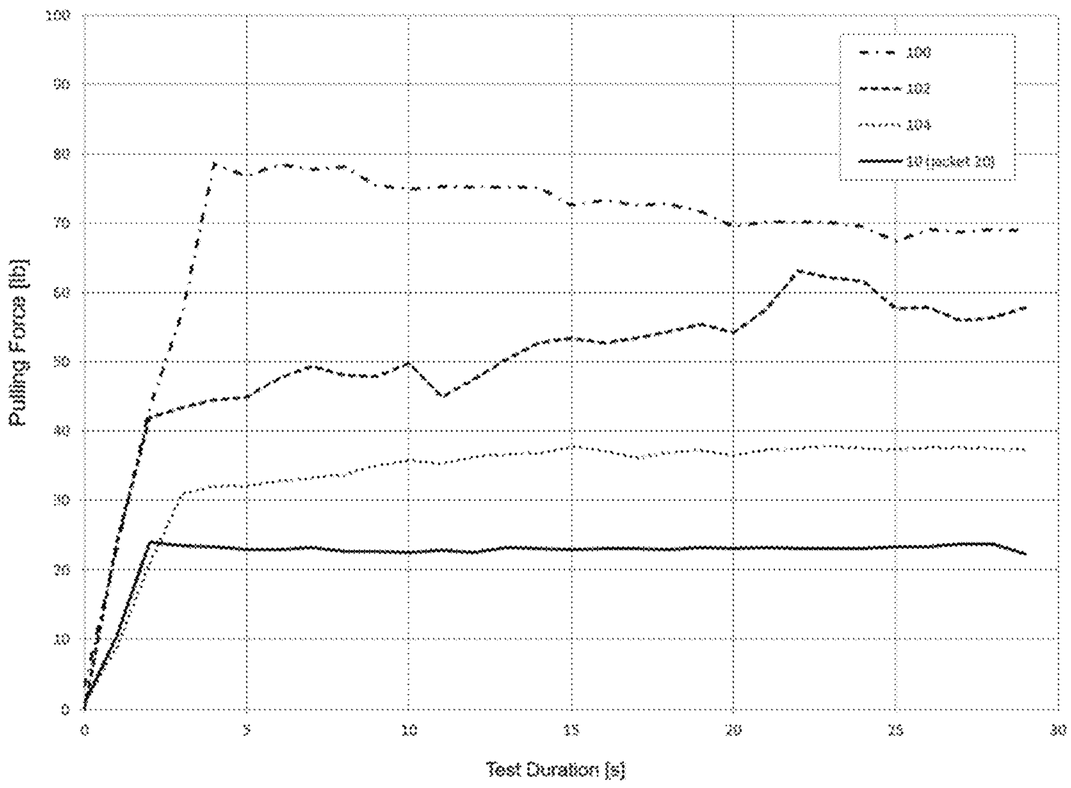
FIG. 3 is chart comparing the required pulling force versus time for the electric cable with a lubricated jacket of FIG. 1, compared to the prior art lubricated cables.

Turning to test results from the test rig 50 run on cable 10, FIG. 3 shows a results table comparing two prior art competitor wires 100 and 102 using only siloxane/silicone lubricant (e.g. southwire and PTI). Another prior art cable 104 is a prior art cable from the present applicants using only paraffin oil (at e.g. 1.7% by weight). Finally, FIG. 3 shows the test results from cable 10 according to a present embodiment where jacket 20 includes approximately 1.7% by weight paraffin oil (e.g. Sunpar 110) combined with approximately 0.5% siloxane by weight (e.g. based on the inclusion of 2% by weight of MB25-020 25% siloxane/75% EVA). Other components of testing cable 10 shown in FIG. 3 may be PVC base at 42%-43% by weight; Phthalate Plasticizer at 25%-26% by weight; Calcium Carbonate at 27%-28% by weight; Stabilizer at 1%-2% by weight; Antimony Trioxide at 0.1%-1% by weight; and siloxane carrier (EVA) at 1.5% by weight.

As illustrated in FIG. 3 prior art cables 100 and 102 and 104 all show pulling forces in range of approximately 30-70 lbs over the 25-30 second pull test, whereas the present cable 10 using paraffin oil at 1.7% and silicone 0.5% averaged about 24 lbs over the same test parameters. Thus, a very small addition of siloxane with the paraffin oil resulted in a nearly 40% reduction in pulling force over paraffin oil alone and an even greater reduction over siloxane alone. This is achieved with a relatively small amount of siloxane added to paraffin oil with only little added costs and no processing errors.

As noted above, the formulation for jacket 20 of cable 10 making use of paraffin oil at 1.7% and silicone 0.5% is only an exemplary formulation. Other formulations using the combination of paraffin oil and siloxane at adjusted ratios may be used. For example, in other embodiments 1.0%-2.0% paraffin oil may be used, and combined with between 0.25%-1.0% siloxane (e.g. by using 1%-4% by weight of MB25-020).

Figure 4:
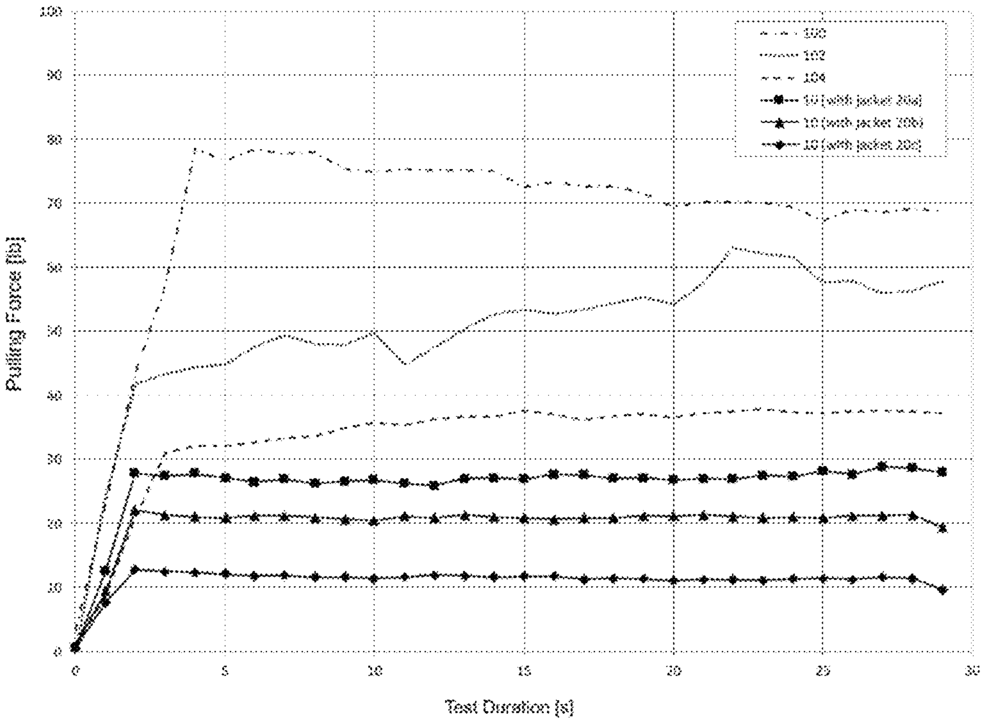
FIG. 4 is another chart comparing the required pulling force versus time for the electric cable with a lubricated jacket of FIG. 1, using different formulations, compared to the prior art lubricated cables.

Additional test data is shown in FIG. 4 compares the same two prior art wires 100 and 102, as well as the same prior art paraffin oil only cable from the present applicant (e.g. wire 104), compared with a cable 10 having jackets 20*a*, 20*b*, and 20*c*, where jacket 20*a* includes paraffin oil at about 1.7% and siloxane at about 0.25% (jacket 20*a*), paraffin oil at about 1.7% and siloxane at about 0.625% (jacket 20*b*), and paraffin oil at about 1.7% and siloxane at about 1% (jacket 20*c*). In each case, the pulling force under the same conditions above in test rig 50 all required less than 30 lbs of force, well below the prior art. Jacket 20*a* pulled at about 27 lbs during the test, jacket 20*b* pulled at about 22 lbs during the test, and jacket 20*c* pulled at about 10 lbs.

While only certain features of the invention have been illustrated, and described herein, many modifications, substitutions, changes or equivalents will now occur to those skilled in the art. It is therefore, to be understood that this application is intended to cover all such modifications and changes that fall within the true spirit of the invention.

The invention claimed is:

1. An electric cable comprising:

a first insulated conductor; and a jacket surrounding said first insulated conductor, wherein a polymer composition of said jacket includes at least a base polymer, a first lubricant, and a second lubricant, wherein said first lubricant is paraffin oil lubricant included in the polymer composition of said jacket in the range of 1%-2% by weight of the jacket polymer composition, and wherein said second lubricant is a siloxane lubricant included in the polymer composition of said jacket in the range of 0.25%-1.0% by weight of the jacket polymer composition.

2. The electric cable as claimed in claim 1, wherein said cable includes a second insulated conductor and a ground wire, said first insulated conductor and said second insulated conductor being insulated with any one of polyamide, PVC, or XLPE.

3. The electric cable as claimed in claim 2, wherein said cable is constructed as either one of an NMD90 (Non-Metallic Dry, rated to operate up to 90° C.) cable or an NM-B cable (Non-Metallic, "B" referring to 90° C. operating temperature rating).

4. The electric cable as claimed in claim 1, wherein said jacket is an extruded PVC (poly vinyl chloride) jacket.

5. The electric cable as claimed in claim 4, wherein said PVC formulation, in addition to said first and second lubricants, further includes any one of or all of Phthalate Plasticizer, Calcium Carbonate, PVC stabilizer, and Antimony Trioxide.

6. The electric cable as claimed in claim 1, wherein said first lubricant is a paraffin oil lubricant included in the polymer composition of the jacket at approximately 1.7% by weight.

7. The electric cable as claimed in claim 1, wherein said second lubricant is a siloxane lubricant included in the polymer composition of the jacket at approximately 0.5% by weight.

8. The electric cable as claimed in claim 1, wherein said second lubricant is a siloxane lubricant added to the polymer composition of the jacket as a combined siloxane/carrier product.

9. The electric cable as claimed in claim 8, wherein said carrier of said combined siloxane/carrier product, is PVC compatible ethyl vinyl acetate (EVA).

10. An electric cable comprising:

at least one insulated conductor; and a jacket surrounding said at least one insulated conductor, wherein a polymer composition of said jacket includes at least a base polymer, a first lubricant, and a second lubricant, wherein said first lubricant is paraffin oil lubricant included in the polymer composition of said jacket in the range of 1%-2% by weight, wherein said second lubricant is a siloxane lubricant included in the polymer composition of said jacket in the range of 0.25%-1.0% by weight, wherein said jacket is an extruded PVC (poly vinyl chloride) jacket, and wherein said PVC formulation includes:

| | | |
|---|---|---|
| PVC base | 37%-47% | by weight; |
| Phthalate Plasticizer | 20%-30% | by weight; |
| Paraffin oil (lubricant 1) | 0.8-2.0% | by weight; |
| Calcium Carbonate | 22%-32% | by weight; |
| Stabilizer | 0.7%-2.2% | by weight; |
| Antimony Trioxide | 0.1%-1.0% | by weight; |
| Siloxane (lubricant 2) | 0.25%-1% | by weight; and |
| Lubricant 2 carrier (EVA) | 0.75%-3% | by weight. |

11. An electric cable comprising:

at least one insulated conductor; and a jacket surrounding said at least one insulated conductor, wherein a polymer composition of said jacket includes at least a base polymer, a first lubricant, and a second lubricant, wherein said first lubricant is paraffin oil lubricant included in the polymer composition of said jacket in the range of 1%-2% by weight, wherein said second lubricant is a siloxane lubricant included in the polymer composition of said jacket in the range of 0.25%-1.0% by weight, wherein said jacket is an extruded PVC (poly vinyl chloride) jacket, wherein said second lubricant is a siloxane lubricant added to the polymer composition of the jacket as a combined siloxane/carrier product, wherein said carrier of said combined siloxane/carrier product, is PVC compatible ethyl vinyl acetate (EVA), and wherein said combined siloxane/carrier product contains 25% by weight of siloxane and 75% by weight of EVA, such that to include 0.25%-1% by weight of siloxane to said polymer composition of the jacket, 1%-4% by weight of said combined siloxane/carrier product is added.

12. An electric cable comprising:

a first insulated conductor surrounded by a first insulation layer;

a second insulated conductor surrounded by a second insulation layer that is distinct from the first insulation layer;

a bare central ground wire disposed between the first insulated conductor and the second insulated conductor; and a jacket surrounding said first insulated conductor, said second insulated conductor and said bare central ground wire, wherein a polymer composition of said jacket includes at least a base polymer, a first lubricant, and a second lubricant, wherein said first lubricant is paraffin oil lubricant included in the polymer composition of said jacket in the range of 1%-2% by weight, and wherein said second lubricant is a siloxane lubricant included in the polymer composition of said jacket in the range of 0.25%-1.0% by weight.

* * * * *